United States Patent [19]
Izumi

[11] Patent Number: 5,331,667
[45] Date of Patent: Jul. 19, 1994

[54] TELEPHONE EXCHANGE APPARATUS WITH COMMUNICATION LINE CLOCKING

[75] Inventor: Michihiro Izumi, Kawasaki, Japan

[73] Assignee: Canon Kabushiki Kaisha, Tokyo, Japan

[21] Appl. No.: 696,176

[22] Filed: May 6, 1991

[30] Foreign Application Priority Data

May 11, 1990 [JP] Japan ............................. 2-119929

[51] Int. Cl.$^5$ .................... H04L 7/00; H04L 7/02; H04J 3/06; H04M 3/00
[52] U.S. Cl. ................................ 375/107; 370/100.1; 375/108; 375/110; 375/118; 375/120; 379/242; 379/290
[58] Field of Search ............... 370/100.1, 105.3; 375/107, 108, 110, 118, 120; 379/230, 290, 242, 243, 246

[56] References Cited

U.S. PATENT DOCUMENTS

| | | | |
|---|---|---|---|
| 4,675,885 | 6/1987 | Gagliardi et al. | 375/110 |
| 5,034,967 | 7/1991 | Cox et al. | 375/110 X |
| 5,038,351 | 8/1991 | Sakai et al. | 375/110 X |
| 5,051,990 | 9/1991 | Kato | 375/107 X |
| 5,138,635 | 8/1992 | Ballance | 375/107 |

FOREIGN PATENT DOCUMENTS

| | | | |
|---|---|---|---|
| 0242117 | 10/1987 | European Pat. Off. | 375/107 |
| 54-101610 | 8/1979 | Japan | 370/58.1 |

*Primary Examiner*—James L. Dwyer
*Assistant Examiner*—Harry S. Hong
*Attorney, Agent, or Firm*—Fitzpatrick, Cella, Harper & Scinto

[57] ABSTRACT

In a telephone exchange apparatus which accommodates digital communication liens and employs a slave synchronization system in which a clock is extracted from a signal received from the network, an exchange switch is operated in synchronism with the extracted clock so as to prevent data omission caused by a difference between operating frequencies of a network and an exchange apparatus. If there is a phase difference between a pre-switching clock and a post-switching clock when the extracted clocks are switched upon changing communication lines, the postswitching clock is delayed by the phase difference between the two clocks so as to cause the phase of the post-switching clock to coincide with the phase of the pre-switching clock.

9 Claims, 13 Drawing Sheets

TELEPHONE EXCHANGE APPARATUS WITH COMMUNICATION LINE CLOCKING

BACKGROUND OF THE INVENTION

1. FIELD OF THE INVENTION

The present invention relates to a telephone exchange apparatus having a means for generating a clock synchronous with a network.

2. PRIOR ART

As is well known, for example, a telephone exchange apparatus for accommodating a digital communication line normally employs a slave synchronization system so as to prevent data omission due to a difference in operating frequency between a network and the exchange apparatus. In this system, a clock is extracted from a signal received from the network, and an exchange switch is operated in synchronism with the extracted clock.

The conventional telephone exchange apparatus uses a phase controlled oscillator for generating an exchange switch operation clock synchronous with the clock extracted from a received signal. FIG. 8 shows a case wherein a DPLL is used as the conventional phase controlled oscillator.

In FIG. 8, reference numeral 30 denotes a phase comparator; 31, a counter; 32, an increment/decrement circuit; 33, a frequency-dividing counter; 34, a clock extracted from a network; 35, a phase comparison DPLL output clock; 36, a phase comparison result signal (for selecting an up- or down-counting operation of the counter 31); 37, a counter clock; 38, a counter carry-out signal; 39, a counter borrow signal; 40, a PLL reference clock; 41, an output after a clock operation of the PLL reference clock; and 42, a PLL output clock used in an operation of the exchange apparatus.

In the conventional phase controlled oscillator with the above arrangement, an operation executed when an 8-kHz frame synchronization timing clock is extracted from a network, and a clock of 32.768 MHz is used as a PLL reference clock will be described below.

As the PLL output clock 42, and the phase comparison PLL output clock 35, clocks obtained by $2^n$-frequency-dividing the PLL reference clock are output.

As the phase comparison PLL output clock 35, an 8-kHz clock which is the same as the clock 34 extracted from the network is output so as to compare phases with the 8-kHz clock extracted from the network. Phases are compared at each rising timing of the two clocks. As a result of comparison, if it is determined that the phase of the clock 34 extracted from the network advances from the clock 35, the value of the counter 31 is incremented by one. When the counter value has reached a preset value, one clock is inserted in the PLL reference clock 40 by the increment/decrement circuit 32. This operation is repeated until a phase difference is eliminated. Thus, the clock slaving to the operation clock of the network can be supplied to the telephone exchange apparatus.

On the other hand, as a result of comparison, if it is determined that the phase of the clock 34 extracted from the network is delayed from the clock 35, the value of the counter 31 is decremented by one. When the counter value has reached a preset value, one clock is removed from the PLL reference clock 40 by the increment/decrement circuit 32. This operation is repeated until a phase difference is eliminated. Thus, the clock slaving to the operation clock of the network can be supplied to the telephone exchange apparatus.

However, in an actual telephone exchange apparatus, it is unusual that the number of clocks extracted from the network input to the phase controlled oscillator is only one, as described above. More specifically, a plurality of digital communication lines are normally accommodated in the exchange apparatus, and when clocks can only be extracted from the accommodated digital communication lines during communications, which clock extracted from the lines is to be used as the clock extracted from the network input to the phase controlled oscillator must be controlled in accordance with the communication conditions.

FIG. 9 shows an arrangement of the conventional telephone exchange apparatus having the above-mentioned phase controlled oscillator. In FIG. 9, reference numeral 43 denotes communication lines connected to the network; 44, a line interface for interfacing with the network; 45, a network synchronization unit; 46, a central control unit; 47, an exchange switch; 48, a memory; 49, an extension interface unit; 50, telephone sets connected to the extension interface unit 49; 51, clocks extracted from the lines; 52, signals indicating line conditions; 53, an exchange switch operation clock; 54, a highway; and 55, an address bus/data bus.

FIG. 10 shows the first detailed arrangement of the conventional network synchronization unit 45.

In FIG. 10, reference numeral 56 denotes a selector; 57, a priority encoder; 58, a flip-flop; 59, a clock phase difference absorbing unit; 60, a phase controlled oscillator; 61, a switching timing generator; 65, an output frequency-divided clock; 66, a synchronization clock; and 67, an input clock to the phase controlled oscillator.

The operation of the conventional first network synchronization unit 45 will be described below with reference to FIGS. 9 and 10. In this case, a clock switching section will be mainly described.

The line interface unit 44 extracts a timing from a received signal from the network, and generates 8-kHz clocks CLK0 to CLKn by the PLL. The unit 44 outputs the clocks CLK0 to CLKn to the network synchronization unit 45. Suffixes 0 to n attached to the signal names correspond to lines from which the clocks are extracted, and in the following description, n=8. In communication state with the network, the 8-kHz clock to be output is synchronized with the timing of the network. However, in a non-communication state, a clock is generated by an independent quartz oscillator, or the like, and is not always synchronized with the timing of the network.

The line interface unit 44 outputs signals COM0 to COMn indicating line conditions to the network synchronization unit 45. The line interface unit 44 outputs, as the signals COM0 to COMn, signals at logic "0" in a communication state, and signals at logic "1" in a non-communication state. Note that suffixes 0 to n added to the signal names represent line numbers, and in the following description, n=8.

The line condition signals COM0 to COM8 are input to the priority encoder 57 (FIG. 10) of the network synchronization unit 45. The priority encoder 57 converts the smallest line number of those of the lines at logic "0" into 3-bit binary data, and outputs the binary data to the flip-flop 58.

For example, when the signals COM2, COM5, and COM8 are at logic "0", 3-bit data "010" is output When all the line condition signals are at logic "1" i e when no communications are performed at all, 3-bit data "000" is output. In this case, the clock CLK0 is selected and output. The clock CLK0 is a clock of a predetermined line number "0" and the clock extracted from this line is selected.

The output from the priority encoder 57 is temporarily latched by the flip-flop 58, and is then input to the selector 56 having an 8-bit input. The selector 56 selects a clock to be output to the phase controlled oscillator 60 from the eight 8-kHz clocks 51 supplied from the line interface unit 44. For example, when the signals COM2, COM5, and COMB are at logic "0", since the output from the priority encoder is 3-bit data "010" the clock CLK2 is selected When the second line 2 starts a communication, the signal COM2 goes to logic "1", and the output from the priority encoder 57 is changed to 3-bit data "101". The selector 56 selects the clock CLK5 according to the output from the encoder 57, and the clock CLK5 is input to the phase controlled oscillator 60.

When the conventional clock phase difference absorbing unit 59 outputs the clock signal 63 input from the selector 56 to the phase controlled oscillator 60, it merely outputs it in synchronism with the synchronization clock signal 66 from the phase controlled oscillator 60, and can merely absorb a phase difference from the internal clock of the phase controlled oscillator 60.

With the above-mentioned operations, a switching operation is performed, so that a clock extracted from the line in communication can be input to the phase controlled oscillator 60.

FIG. 11 shows the second detailed arrangement of the conventional network synchronization unit 45. Note that other arrangements are the same as those shown in FIG. 9.

In FIG. 11, reference numeral 70 denotes a clock phase difference absorbing unit, which has delay circuits corresponding to input clocks. Reference numeral 71 denotes a flip-flop; 72, a selector; 73, a phase controlled oscillator; and 74, a switching timing generator. Reference numeral 75 denotes a selector control signal; 76, a selected extracted clock; 77, a switching timing signal; 78, a switching timing generator output and 79, an output frequency-divided clock.

The operation of the conventional second network synchronization unit 45 will be described below with reference to FIGS. 9 and 11. In this case, a clock switching section will be mainly described.

The operation of the line interface unit 44 is the same as that described above. 8-kHz clocks output from the line interface unit 44 are input to the phase difference absorbing unit 70 shown in FIG. 11. The outputs from the phase difference absorbing unit 70 are input to the selector 72, and are switched by the selector 72 in accordance with the selector control signal (clock switching control signal 75) from the flip-flop 71 which latches the signals 52 (COM0 to COMn) output from the line interface unit 44 and indicating line conditions (communication conditions).

The clock phase difference absorbing unit 70 is a circuit for eliminating the influence of a phase difference among clocks extracted from the lines. The timings of the respective lines have phase differences due to delay time differences in respective line transmission paths. For this reason, the respective clocks are optimally delayed, so that phases of the clocks input to the phase controlled oscillator 73 are locked, thereby preventing a phase difference before and after a clock switching operation.

However, the first prior art suffers from the following drawbacks since the means such as the priority encoder 57, the selector 56, and the like are used as means for switching clock signals to be input to the phase controlled oscillator 60.

(1) In order to obtain a stable output from the phase controlled oscillator 60, it is preferable that a clock input to the phase controlled oscillator 60 is also stable. For this purpose, the switching frequency of clocks is preferably as small as possible.

In the conventional arrangement, however, even when a given line maintains a communication state for a long period of time, if a line having a smaller number than the given line starts or ends a communication, the clock is unconditionally switched, and a stable clock cannot be input.

(2) When all the lines are in a non-communication state, a clock from a predetermined line is selected. the lines must be accommodated in turn from a predetermined line position in a predetermined order. For this reason, it is troublesome to connect lines to the exchange apparatus, and a connection error may OCCUr.

In the second prior art, since all the clocks extracted from the lines are input to the phase difference absorbing unit 70, delay circuits corresponding in number to the lines are undesirably required.

In particular, this poses a serious problem in a telephone exchange apparatus which accommodates a large number of lines.

SUMMARY OF THE INVENTION

The present invention has been made to solve the above problems, and has as its object to provide a telephone exchange apparatus which allows, e.g., a central control unit to control a selection means in accordance with a line condition, thereby increasing flexibility of clock control, and at the same time, simplifying circuits.

It is another object of the present invention to provide a telephone exchange apparatus which can eliminate the influence of a clock switching operation to other circuits by locking a phase of a pre-switching clock with a phase of a post-switching clock if there is a phase difference between the pre- and post-switching clocks in an extracted clock switching operation executed when a communication line is changed.

The present invention comprises the following arrangement as means for achieving the above objects.

More specifically, a telephone exchange apparatus comprises connection means for connecting a plurality of communication lines, clock extraction means for extracting clocks from communication signals on the lines connected by the connection means, signaling means for signaling clock extraction enable/disable information by the clock extraction means to a connection controller, selection means for receiving the clocks extracted by the clock extraction means, and selecting and outputting at least one of the input extracted clocks in correspondence with the clock extraction enable/disable information by the clock extraction means, and generation means for generating a synchronization clock in communication control on the basis of the extracted clock selected by the selection means.

The connection means can connect a maximum of n lines, and the selection means reads out an algorithm stored in a memory for storing algorithms for performing selection control of extracted clocks in correspondence with the clock extraction enable/disable information, and performs selection control of the extracted clocks in accordance with control signals from at least log2n output ports of selection control means, which ports correspond to the clock extraction enable/disable information from the clock extraction means.

The apparatus further comprises data input means for inputting data from the lines connected by the connection means to a line exchange switch in synchronism with the selected extracted clock selected by the selection means.

Furthermore, the apparatus further comprises data input means for inputting data from the lines connected by the connection means to a line exchange switch in synchronism with the selected extracted clock selected by the selection means.

A telephone exchange apparatus comprises connection means for connecting a plurality of communication lines, generation means for generating a reference signal which is in phase with an input signal from the lines connected by the connection means, clock extraction means for extracting clocks from communication signals on the lines connected by the connection means, selection means for selecting the predetermined number of clocks from the clocks extracted by the clock extraction means, detection means for detecting a phase difference between the clock selected by the selection means, and the reference signal generated by the generation means, delay means for delaying the clock selected by the selection means by the phase difference detected by the detection means, and input means for inputting the clock delayed by the delay means to the generation means.

Furthermore, the selection means outputs a newly selected clock, and a latest selected clock before the selection.

The detection means detects a phase difference between the clock newly selected by the selection means, and the latest selected clock before the selection.

The delay means includes a shift register, and delays the clock newly selected by the selection means using the shift register to cause phases of the latest selected clock before the selection and the selected clock to coincide with each other.

The generation means generates the reference signal on the basis of the latest selected clock before the selection from the selection means before a predetermined time has elapsed from selection of the clock, and generates the reference signal on the basis of the delayed clock from the delay means after the delayed clock from the delay means is stabilized.

The apparatus further comprises data input means for inputting data from the lines connected by the connection means to a line exchange switch in synchronism with the reference signal generated by the generation means.

With the above arrangement, the selection means for receiving a clock extracted from a line, the generation means for generating a clock synchronized with the selected extracted clock by the selection means allow, e.g., a central control unit to control the selection means in correspondence with a line condition, thereby increasing flexibility of clock control, and at the same time, simplifying circuits.

More specifically, when a communication line is changed, and a clock signal extracted from the line is changed, a post-change clock is delayed by a phase difference from a pre-change clock, and the delayed clock is output, so that the influence of a change in clock to other circuits can be minimized.

Other features and advantages of the present invention will be apparent from the following description taken in conjunction with the accompanying drawings, in which like reference characters designate the same or similar parts throughout the figures thereof.

DESCRIPTION OF THE INVENTION

An embodiment of the present invention will be described in detail below with reference to the accompanying drawings.

[First Embodiment]

Figure 1:
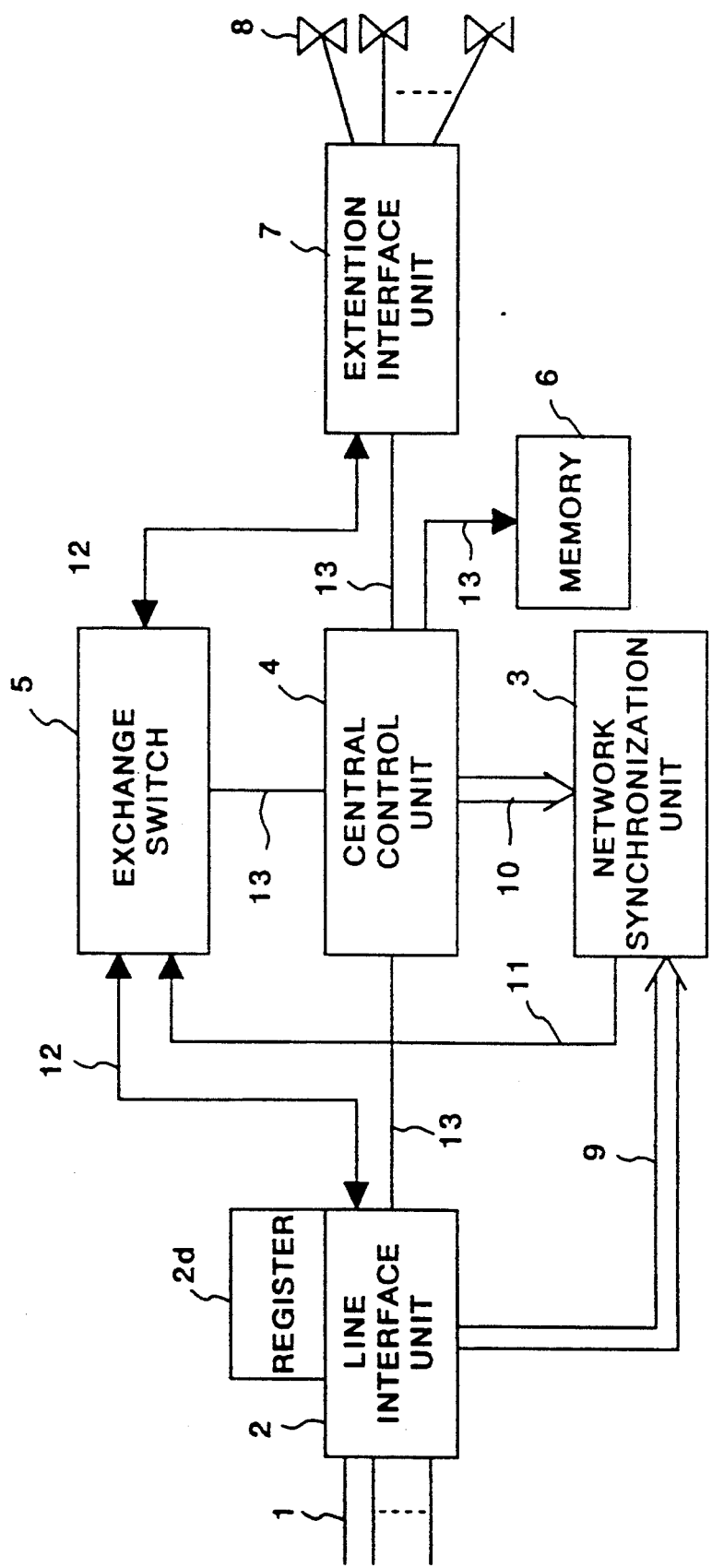
FIG. 1 is a block diagram of a telephone exchange apparatus which incorporates a network synchronization unit according to an embodiment of the present invention.

FIG. 1 is a block diagram showing an arrangement of a telephone exchange apparatus incorporating a network synchronization unit according to an embodiment of the present invention.

In FIG. 1, reference numeral 1 denotes communication lines; 2, a line interface unit; 3, a network synchronization unit; 4, a central control unit; 5, an exchange switch; 6, a memory; 7, an extension interface unit; 8, telephone sets; 9, clocks extracted from the respective lines; 10, a clock switching control signal; 11, an exchange switch operation clock; 12, a highway; and 13, a data bus/address bus.

Figure 2:
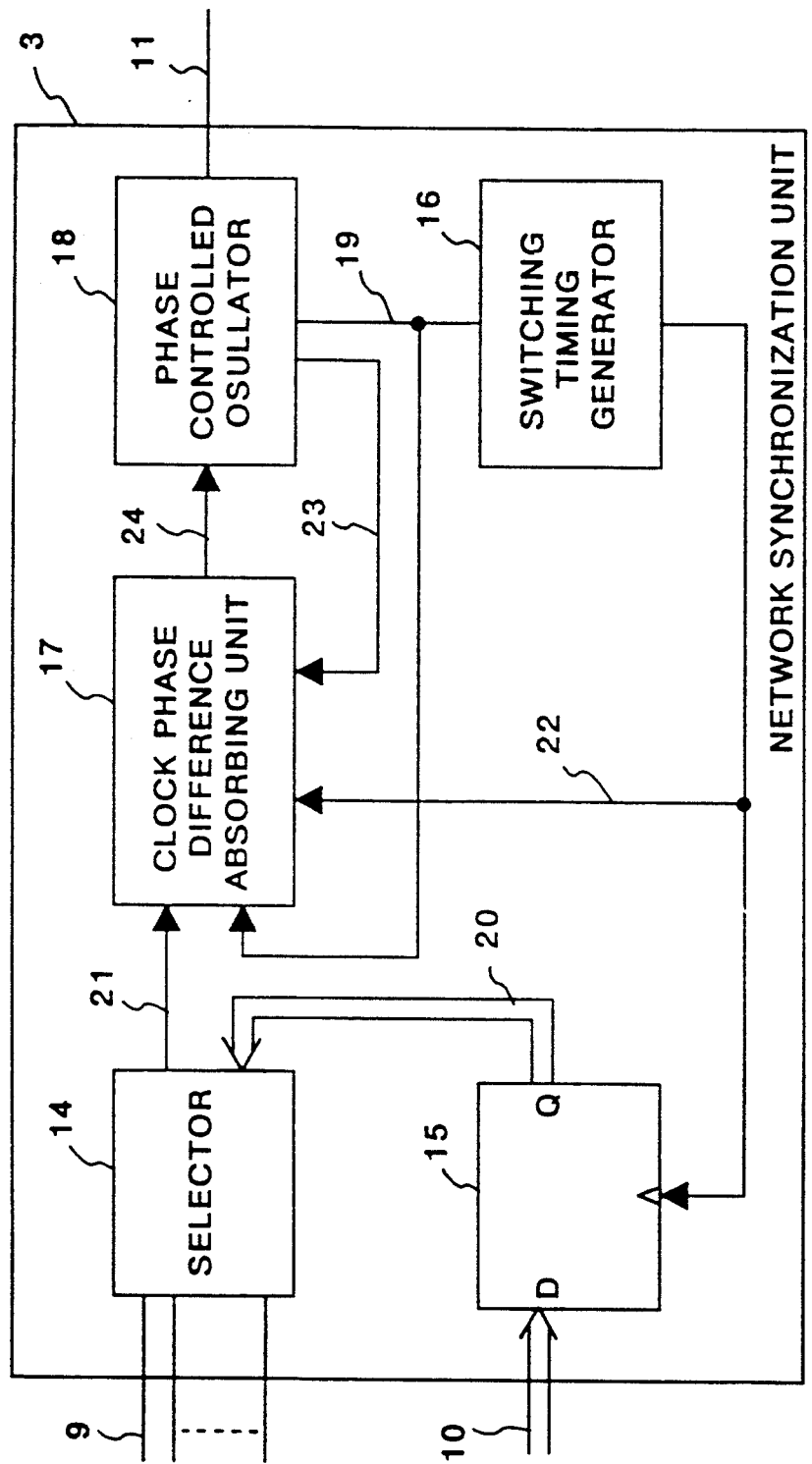
FIG. 2 is a detailed block diagram of the network synchronization circuit of this embodiment.

FIG. 2 shows the detailed arrangement of the network synchronization unit 3 of this embodiment shown in FIG. 1.

In FIG. 2, reference numeral 14 denotes a selector; 15, a flip-flop; 16, a clock switching timing generator; 17, a clock phase difference absorbing unit; 18, a phase controlled oscillator; and 19, an output frequency-divided clock, which is an 8-kHz clock signal in this embodiment. Reference numeral 20 denotes a selector control signal; 21, an extracted clock selected by the selector 14; 22, a switching timing signal; 23, a synchronization clock; and 24, a phase controlled oscillator input clock.

Figure 3:
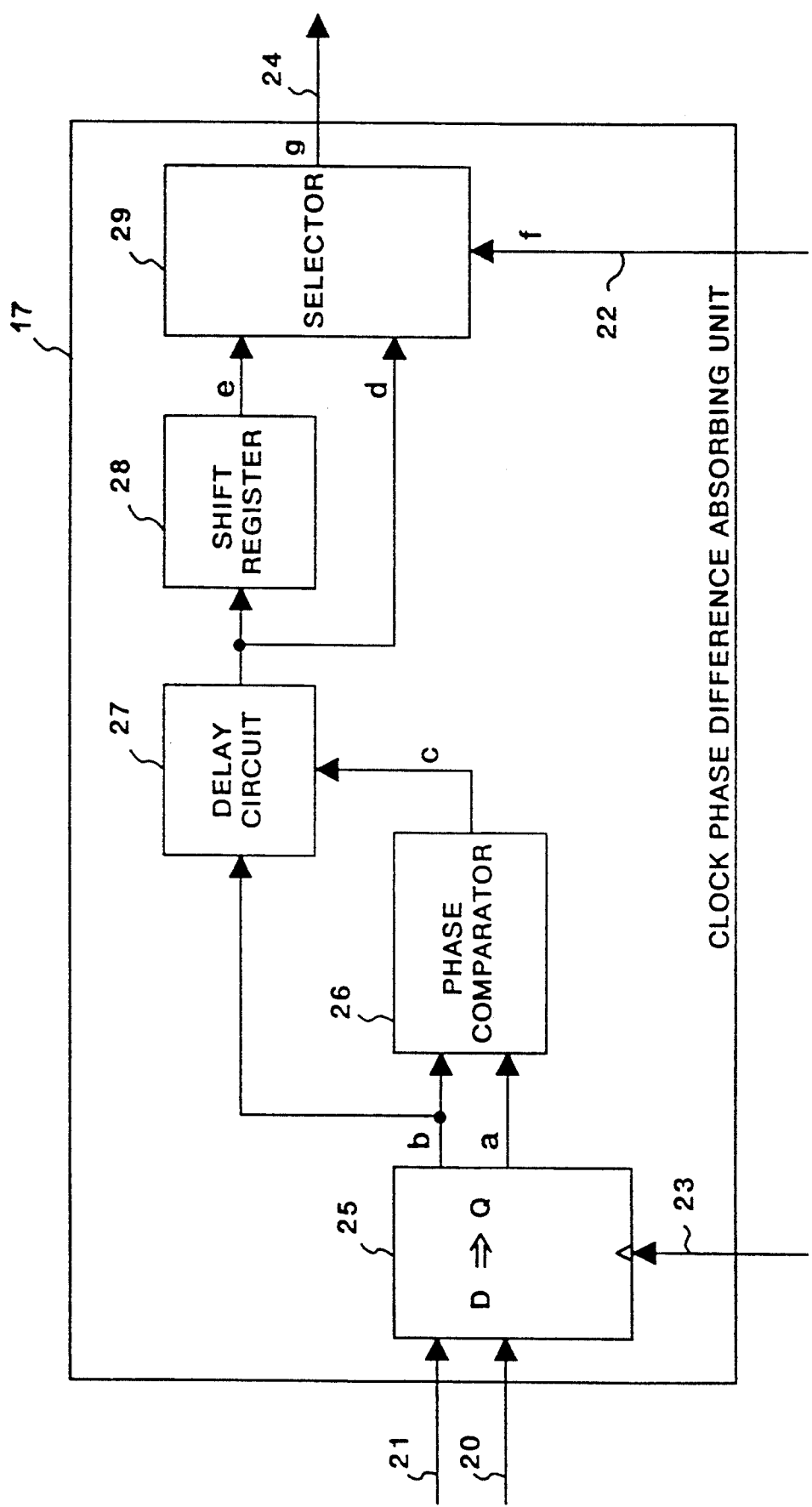
FIG. 3 is a detailed block diagram of a clock phase difference absorbing unit of this embodiment.

FIG. 3 shows the detailed arrangement of the clock phase difference absorbing unit of this embodiment shown in FIG. 2.

In FIG. 3, reference numeral 25 denotes a flip-flop; 26, a phase comparator; 27, a delay circuit; 28, a shift register; and 29, a selector.

The operation of this embodiment comprising the above-mentioned arrangement will be described below with reference to the timing charts of FIGS. 4 and 5.

The line interface unit 2 extracts a timing from a received signal from the network, and generates 8-kHz clocks CLK0 to CLK8 by a PLL. In a communication state with the network, the 8-kHz clock to be output is synchronized with the timing of the network. However, in a non-communication state, a clock is generated by an independent quartz oscillator, or the like, and is not always synchronized with the timing of the network.

The line interface unit 2 includes a register 2d indicating a communication condition, and the central control unit 4 reads out condition data set in the register to detect a line condition (communication condition).

The 8-kHz clock signals output from the line interface unit 2 are input to the selector 14 (FIG. 2) of the network synchronization unit 3. The selector 14 selects and outputs one of the input clock signals in accordance with the clock switching control signal 10 output from an output port incorporated in the central control unit 4. The clock switching control signal 10 is output in accordance with a switching control table which is realized as firmware in various patterns according to communication conditions and is stored in the memory 6.

The central control unit 4 properly reads the register 2d of the line interface unit 2 to read out the line condition, and outputs an optimal clock switching control signal 10 from its output port in accordance with the switching control table stored in the memory 6 in quick response to a recognized change in communication condition, thus minimizing the number of times of switching operations.

Figure 12A:
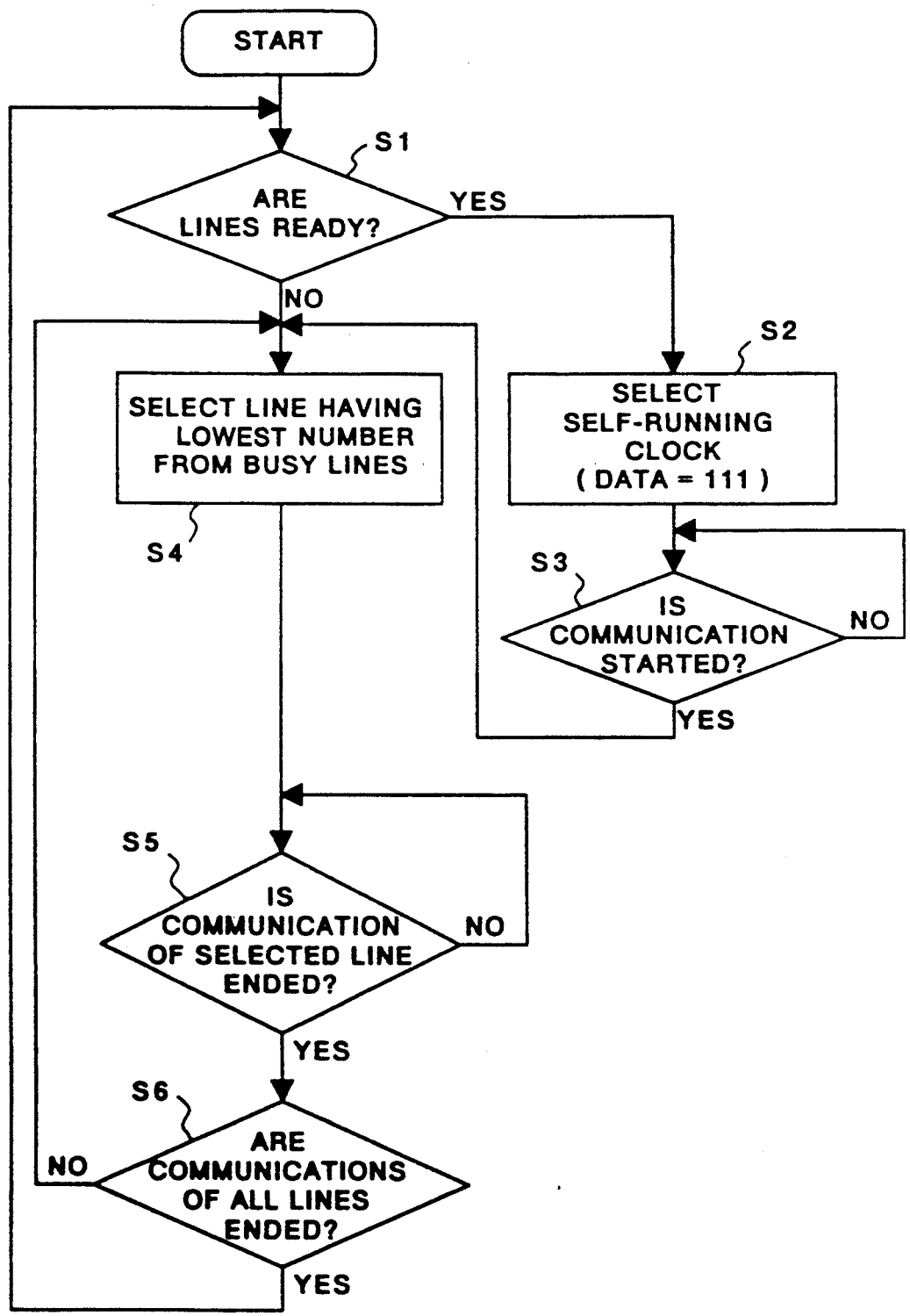
FIGS. 12A and 12B are flowcharts showing examples of a switching control table stored in the memory of this embodiment.
Figure 12B:
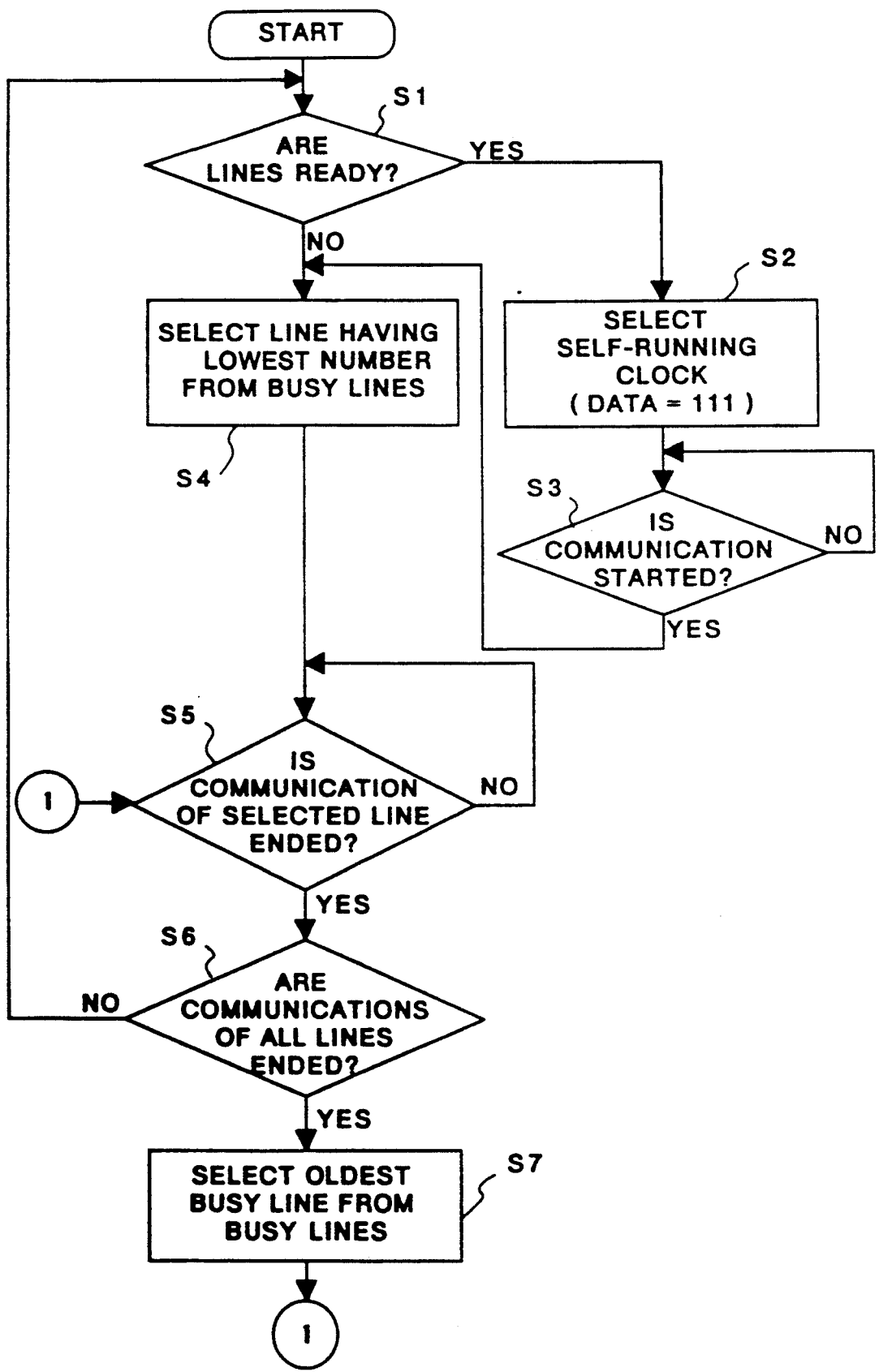

FIGS. 12A and 12B show examples of a switching control table stored in the memory 6. The flow charts shown in FIGS. 12A and 12B are executed by the central control unit 4.

In FIG. 12A, if it is determined in step S1 that all the lines are ready, the flow advances to step S2. In step S2, a value '111' as data for selecting a free-running clock is sent to the network synchronization unit 3.

The network synchronization unit 3 supplies a free-running clock (about 8 kHz) to the exchange switch 5 on the basis of data = '111' from the central control unit 4. The free-running clock is used by the exchange switch 5 in a stand by mode of the apparatus. In step S3, it is checked if a Communication is started. If it is determined in step S3 that the communication is started, the flow advances to step S4. In step S4, a line which is switched to a busy state is selected to extract a clock. When a plurality of lines are switched to a busy state at the same time, the line having the lowest line number is selected. It is checked in step S5 if a communication of the line selected in step S4 is ended. If Y in step S5, the flow advances to step S6. In step S6, it is checked if communications of all the connected lines are ended. If it is determined in step S6 that the communications of all the connected lines are not ended, the flow returns to step S4, and a line having the lowest line number is selected from the lines in communication so as to extract a clock. If it is determined in step S6 that the communications of all the connected lines are ended, the flow returns to step S1, and a standby state is set.

In an arrangement for selecting a line according to a conventional hardware logic, if a line having a lower line number than that of a line which is currently used in clock extraction is used, the line having the lower line number is selected for clock extraction. Therefore, the switching frequency of lines becomes very high.

As compared to this arrangement, according to the embodiment shown in FIG. 12A, since lines are selected in a software manner, once a line is selected, the selected line can be held until a communication is ended. In this manner, the switching frequency of lines can be decreased, and clocks can be stably supplied.

FIG. 12B is a flow chart as a partial modification of FIG. 12A.

In steps S1 to S6 in FIG. 12B, the same control operations as in steps S1 to S6 in FIG. 12A are executed.

Step S7 is executed when a communication of a line which is selected first from a state wherein all the lines are ready. More specifically, step S7 is executed when the second and subsequent line selections are performed from a state wherein all the lines are ready. In step S7, the oldest busy line is selected from lines in use so as to extract a clock.

The reason why the oldest busy line is selected will be explained below. The oldest busy line has been subjected to many phase synchronization operations with clocks of other lines. Therefore, the phase synchronization operation with clocks of other lines of this line is almost close to its limit. Thus, the oldest busy line itself is selected for clock extraction, so that the selected line need not be subjected to phase synchronization.

In this manner, according to the flow chart shown in FIG. 12A, the switching frequency of clocks can be decreased, and clocks can be stably supplied. According to the flow chart shown in FIG. 12B, since the oldest busy line is selected in the second and subsequent line selections for clock extraction, disconnection of a communication caused by a phase asynchronization state with clocks of other lines can be prevented.

The clock switching control signal 10 is temporarily latched by the flip-flop 15 to be synchronized with an operation timing of the clock phase difference absorbing unit 17 (to be described later) after it is input to the selector 14 of the network synchronization unit 3.

The timings of the respective lines have phase differences due to delay time differences in respective line transmission paths. The clock phase difference absorbing unit 17 is a circuit for eliminating the influence of a phase difference between clocks when the clocks extracted from the lines are switched.

Figure 4:
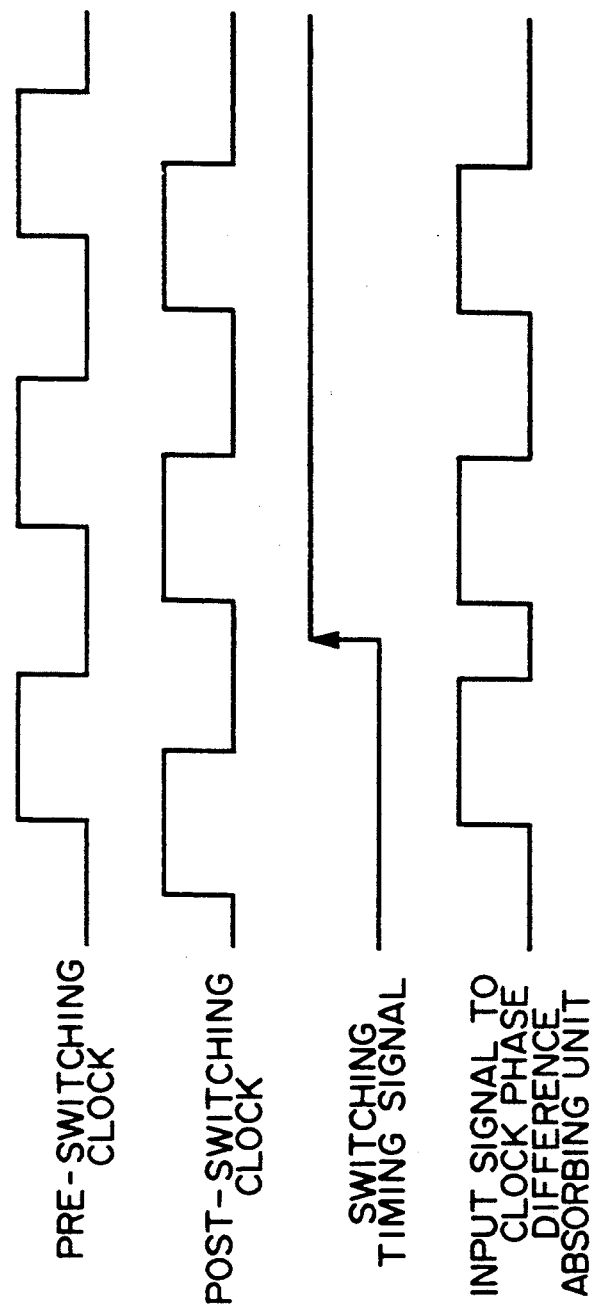
FIG. 4 is a timing chart showing phase difference controlled oscillator input signals without a phase difference absorbing unit.

FIG. 4 shows the input clock 21 to the clock phase difference absorbing unit 17 when the phase of a pre-switching clock is different from that of a post-switching clock in the selector 14.

Figure 8:
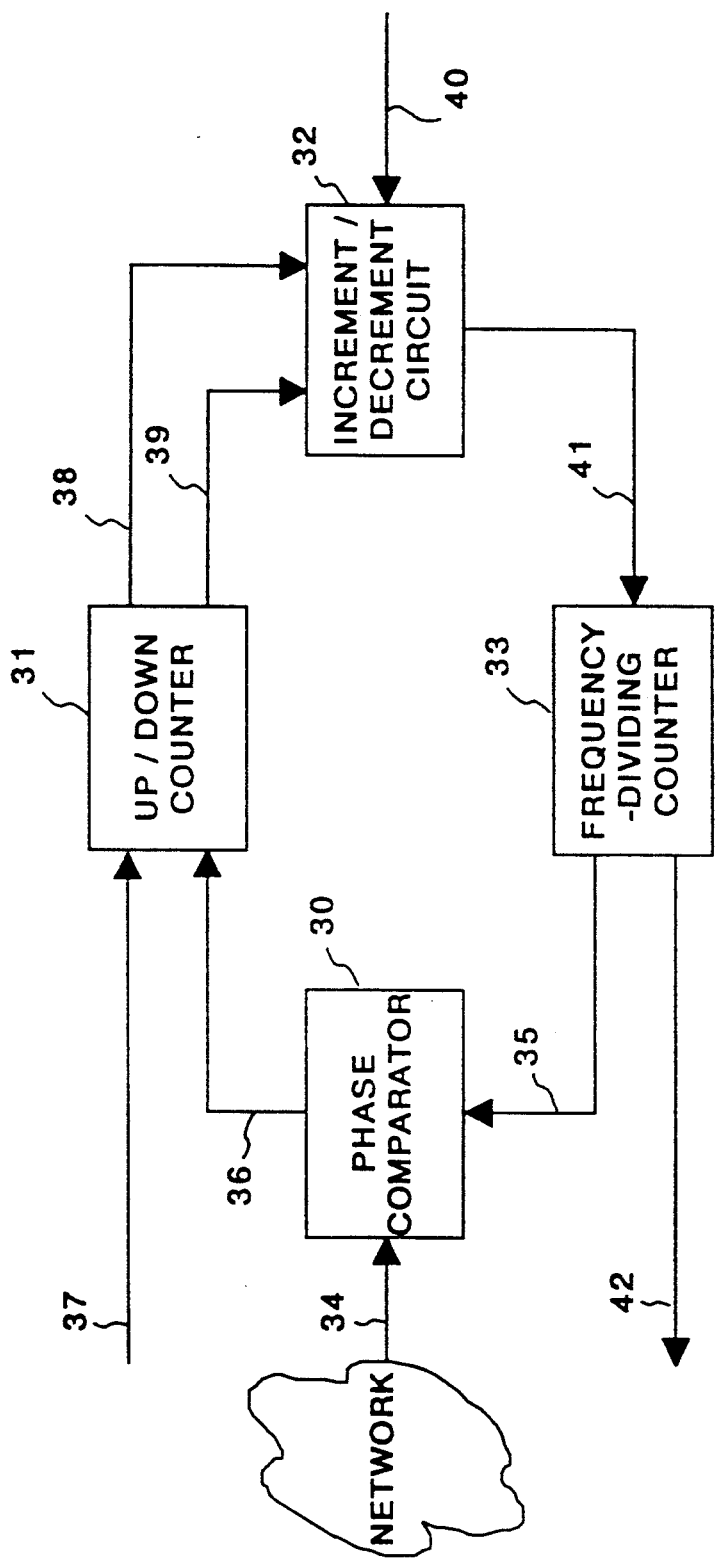
FIG. 8 is a block diagram of a conventional phase difference controlled oscillator.
Figure 9:
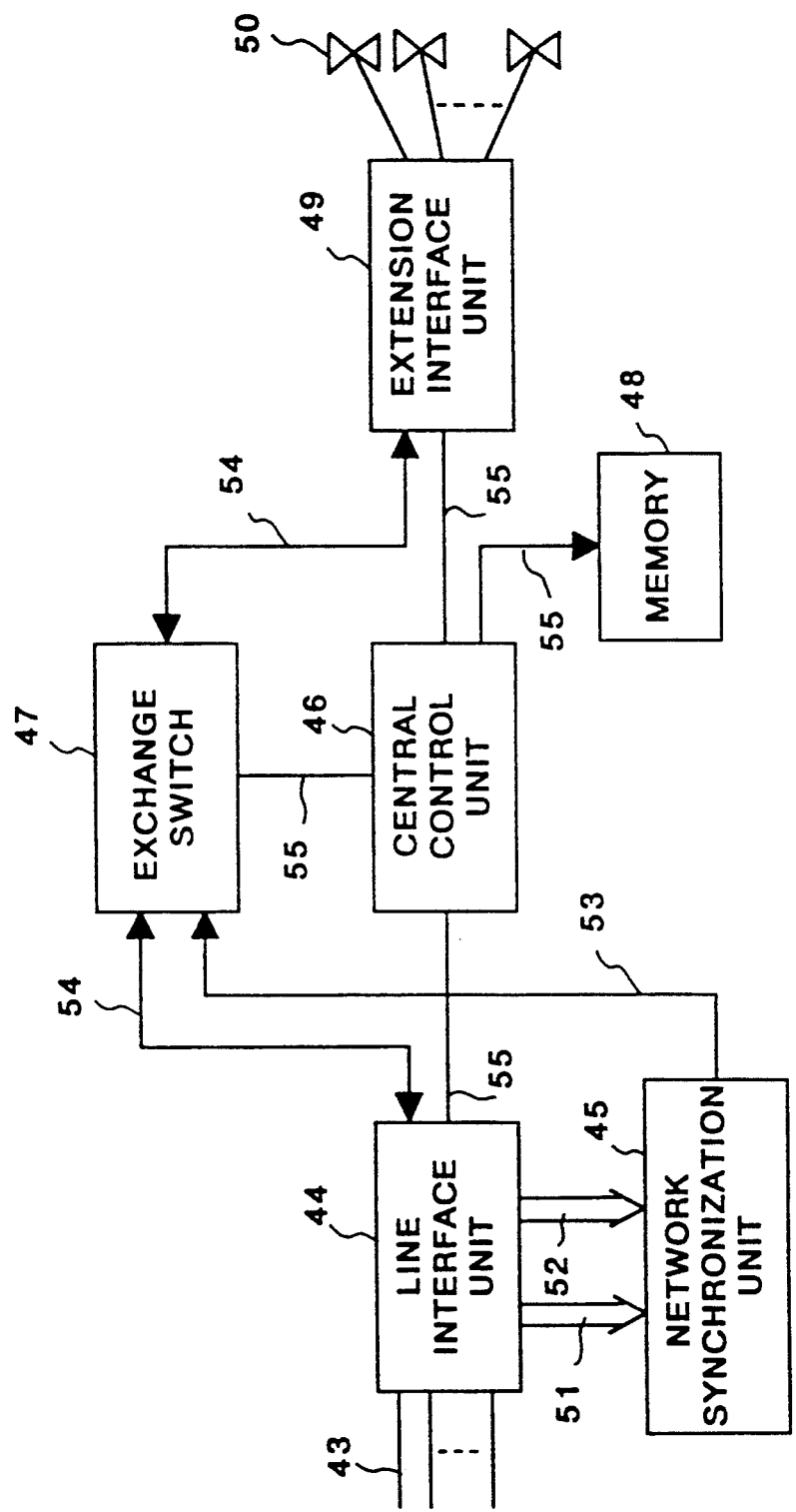
FIG. 9 is a block diagram showing a conventional telephone exchange apparatus.
Figure 10:
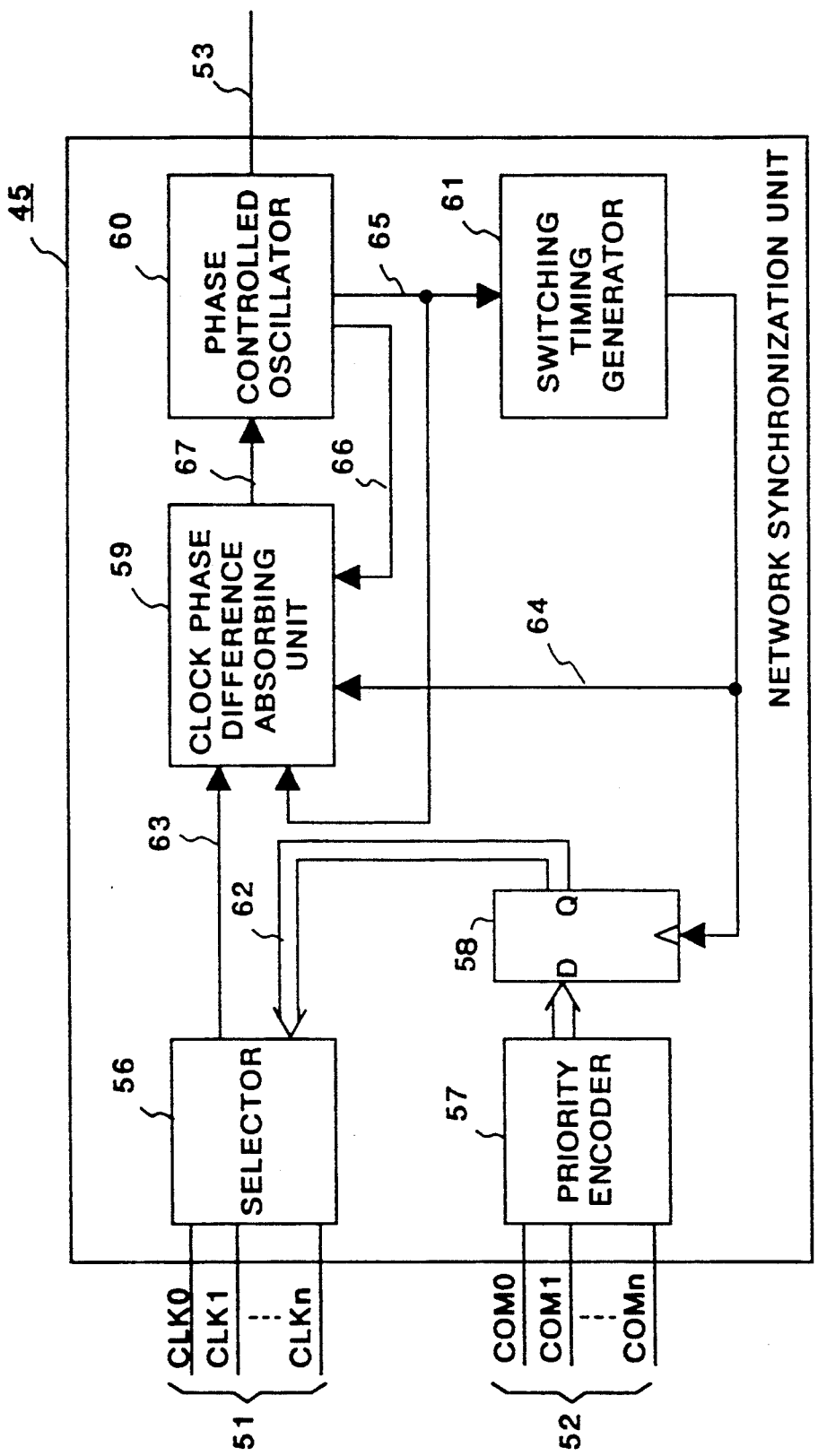
FIG. 10 is a block diagram showing a conventional network synchronization unit.
Figure 11:
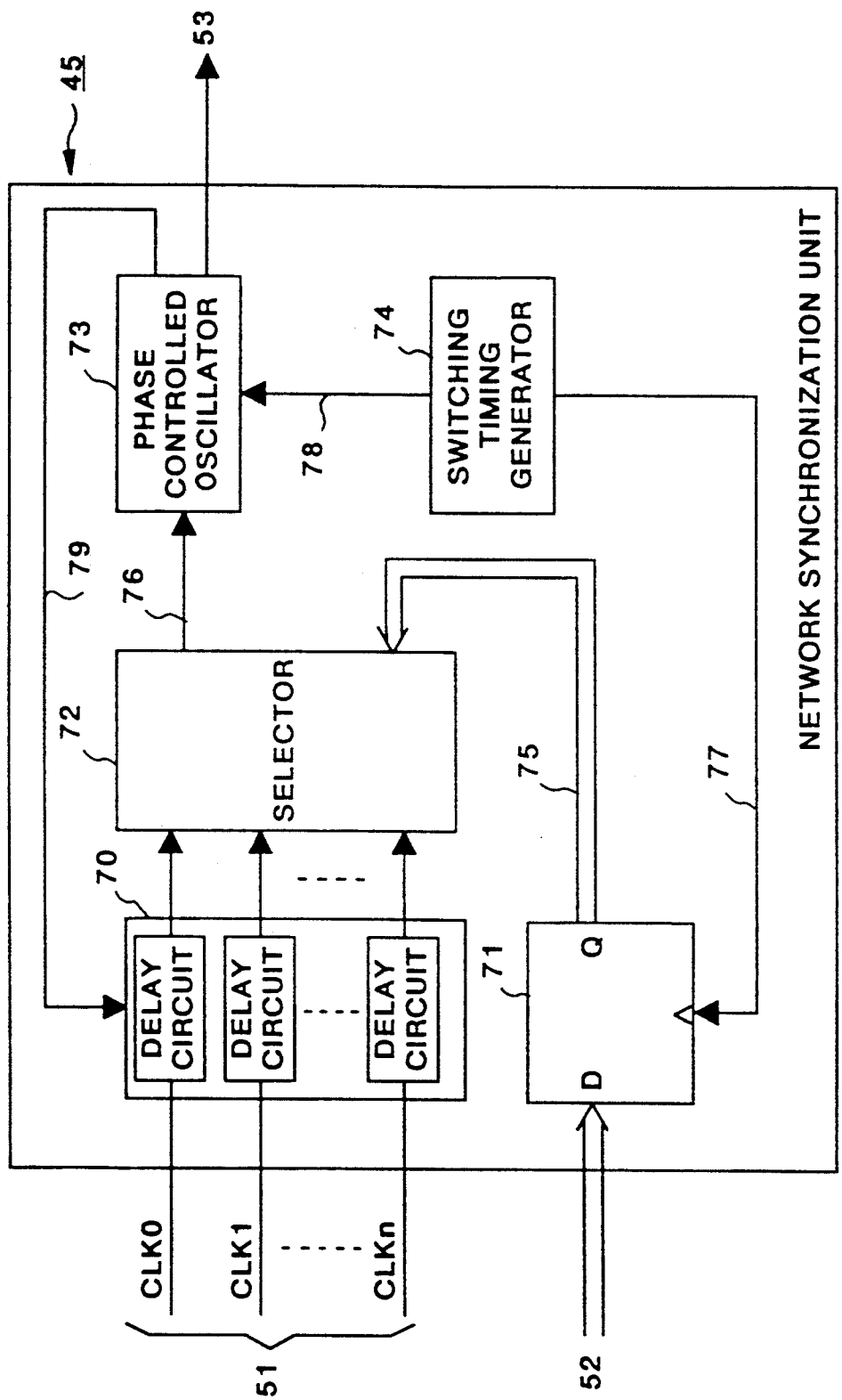
FIG. 11 is a block diagram showing the second detailed arrangement of the conventional network synchronization unit.

The phase controlled oscillator 18 of this embodiment has the same arrangement as that of the conventional one shown in FIG. 8 described above. For this reason, when the clock signal including a phase difference shown in FIG. 4 is directly input to the phase controlled oscillator 18, an increment/decrement circuit is operated under the above-mentioned control, and one clock is inserted in the PLL reference clock.

In order to effectively prevent such a phenomenon, according to this embodiment, control is made such that the clock input to the phase controlled oscillator 18 does not suffer from a change in phase upon switching by the following operation of the clock phase difference absorbing unit 17.

The operation of the clock phase difference absorbing unit 17 of this embodiment will be described below with reference to FIG. 5. Note that reference symbols a to g in FIG. 5 correspond to output signals a to g in FIG. 3.

In order to cause the phase of an extracted clock b from a switched line to coincide with the phase of a pre-switching clock a, the clocks a and b are latched by the flip-flop 25 in response to the synchronization clock 23 having a higher frequency than the extracted clocks, and output from the phase controlled oscillator 18.

In this manner, the clocks are synchronized with the synchronization clock 23. In the conventional apparatus, the synchronized signal is directly output to the phase controlled oscillator. However, in this embodiment, the following control is made.

The phase comparator 26 compares a phase difference between the pre-switching clock a and the post-switching clock b, which are latched by the flip-flop 25, and outputs a comparison result c indicating a time corresponding to the phase difference. The delay circuit 27 outputs a clock d obtained by delaying the post-switching clock b by the comparison result signal c from the phase comparator 26 to the shift register 28 and the selector 29.

At this time, since the two clocks a and b are synchronized with the synchronization clock 23, only one clock can be easily delayed using, e.g., the shift register.

In order to prevent an asynchronous state of clocks caused by a phenomenon shown in FIG. 4 while the phase comparator compares the phases of the two clocks a and b, the selector 29 outputs a clock e obtained by delaying the post-switching clock b by the shift register 28 to the phase controlled oscillator 18 during a phase comparison period.

A timing signal for switching whether the clock is input to the phase controlled oscillator 18 with or without going through the shift register 28 is generated by the clock switching timing generator 16 so as not to switch the clocks at their leading or trailing edges.

In this manner, even when a signal from a line is changed, the phases of pre- and post-switching clock signals are compared, the post-switching clock signal is delayed by their phase difference, and the delayed signal is output, so that the pre- and post-switching clocks will not be different from each other.

When the clock signal is further switched thereafter, a signal obtained a signal from the line by a given delay time by the delay circuit 27 using the phase comparison result c between the pre- and postswitching clock signals as a reference pre-switching clock signal is used.

Figure 5:
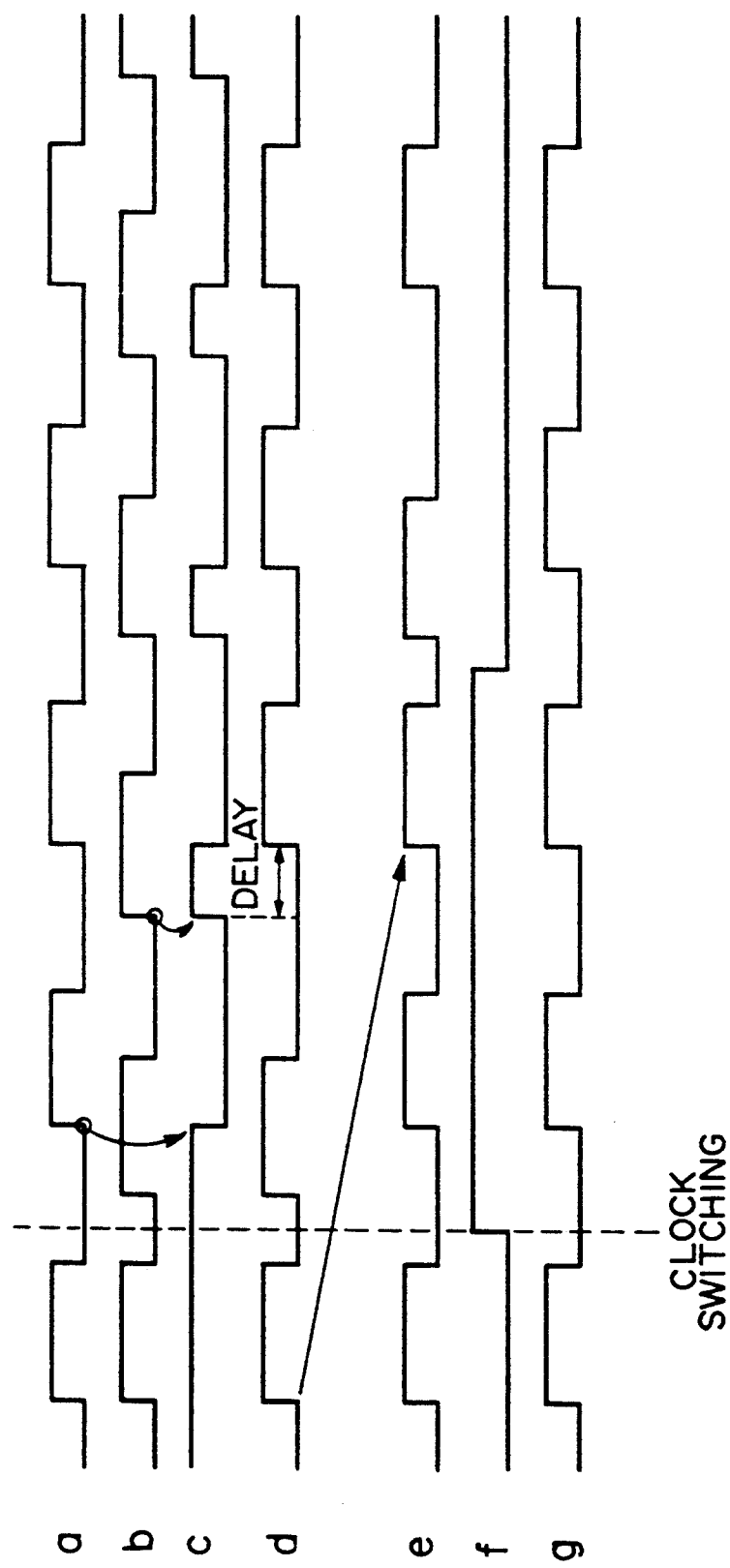
FIG. 5 is an operation timing chart of the phase difference absorbing unit of this embodiment.

FIG. 5 is a timing chart schematically showing the above-mentioned operations. The reference symbols a to g in FIG. 5 correspond to those of the signals shown in FIG. 3.

In the above description, the number of communication lines connected to the telephone exchange apparatus is eight. However, the number of accommodated communication lines of this embodiment is not limited to this, and the same effect as described above can be obtained by the above arrangement regardless of the number of communication lines.

For example, as can be easily understood from the above description, when the telephone exchange apparatus can connect n lines, the number of clock switching control signals 10 output from the central control unit 4 is log2n. Therefore, as the number of accommodated lines n is increased, the effect of this embodiment can be more outstanding.

In the above description, the telephone exchange apparatus include one central control unit 4. In a large-scale system, however, it is difficult to control all the operations by one central control unit 4. Therefore, this embodiment also includes a case wherein a plurality of central control units 4 are used.

In this case, when the central control unit 4 for accessing a register indicating a communication condition, and for outputting a switching timing signal is arranged in, e.g., the line interface unit 2, the same effect as described above can be expected.

In the above description, the apparatus is connected to lines from which clocks can be extracted in only a communication state. However, the clock extraction timing is not limited to this. When the apparatus of the present invention is connected to lines from which clocks can be extracted even in a non-communication state, it can always extract clocks, and can be utilized in processing when supply of clocks is disabled due to a line trouble. Therefore, the same effect as described above can be expected.

As described above, according to this embodiment, the following effects can be obtained.

(1) The switching frequency of a clock to be input to the phase controlled oscillator 18 can be decreased, and a clock to be generated can be further stabilized.

(2) Even when all the lines are in non-communication state, since a line to be selected need not be determined beforehand, limitations upon connection of the lines to the exchange apparatus can be removed.

(3) The circuits can be simplified as compared to the prior arts.

(4) The number of signal lines input to the network synchronization unit 3 can be decreased from 2n to (n+log2n).

[Second Embodiment]

In the first embodiment described above, if there is a phase difference between pre- and post-switching clocks upon switching of the clocks, the post-switching clock is delayed by a required time by the delay circuit 27 of the clock phase difference absorbing unit 17 (FIG. 3) so as to lock the phase of the post-switching clock with that of the pre-switching clock.

However, the method of locking the phases of the two clocks is not limited to the above-mentioned method, but may be realized by using, e.g., a shift register.

The second embodiment of the present invention for delaying a post-switching clock by a shift register will be described hereinafter.

In the second embodiment to be described below, the overall arrangement of the telephone exchange apparatus is that shown in FIG. 1, and the overall arrangement of the network synchronization unit 3 is that shown in FIG. 2.

Figure 6:
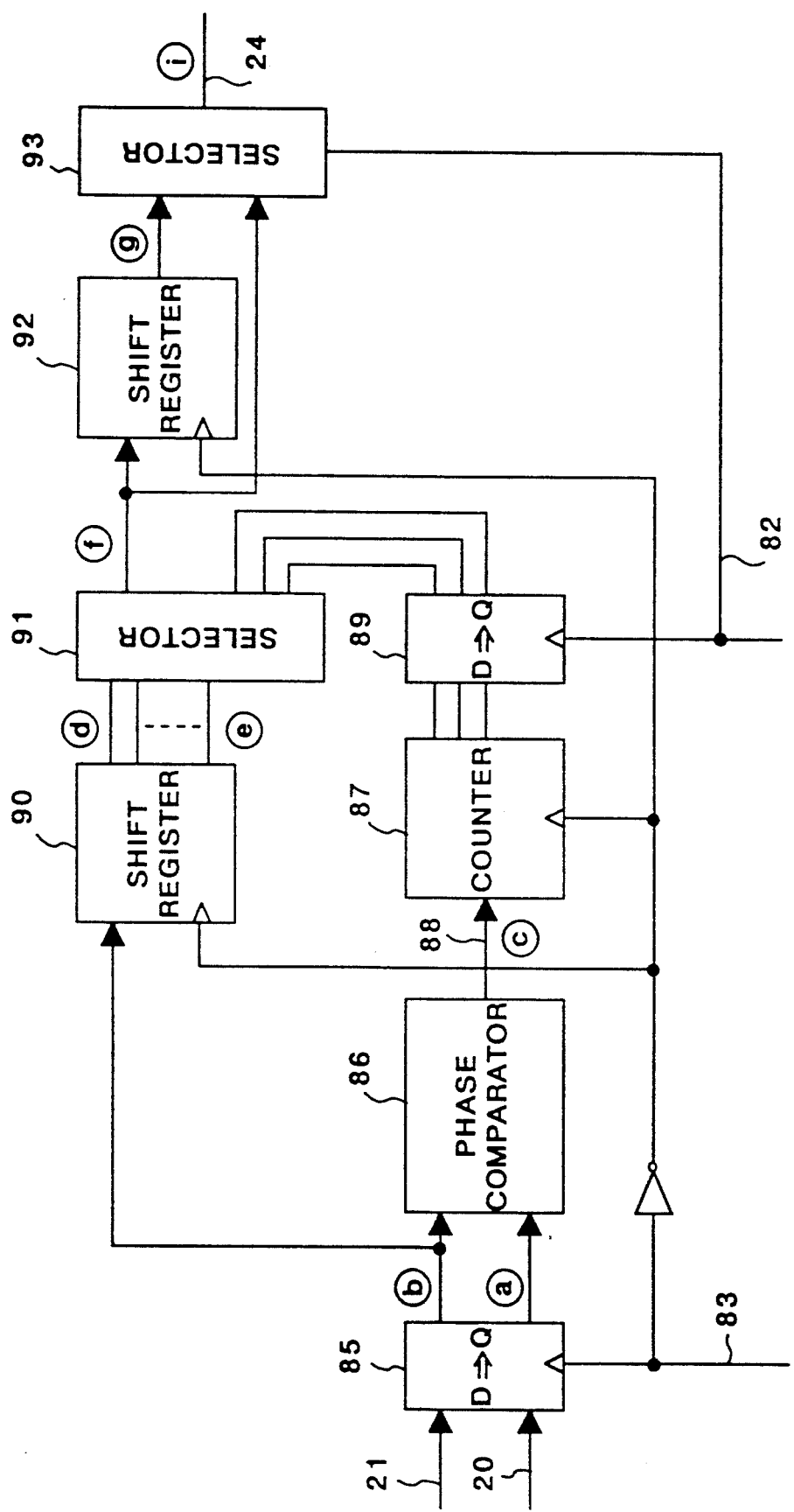
FIG. 6 is a detailed block diagram of a clock phase difference absorbing unit according to the second embodiment of the present invention.

In the second embodiment, the clock phase difference absorbing unit 17 of the network synchronization unit 3 can have an arrangement shown in FIG. 6.

In FIG. 6, reference numeral 85 denotes a flip-flop; 86, a phase comparator; 87, a counter; 88, a counter load signal; 89, a flip-flop; 90 and 92, shift registers; and 91 and 93, selectors.

In the above arrangement, timings of the respective lines in line transmission paths have phase differences based on delay time differences. However, in this embodiment, the clock phase difference absorbing unit 17 shown in FIG. 6 eliminates the influence of the phase difference between the clocks upon switching of the clocks extracted from the lines like in the first embodiment.

More specifically, in this embodiment, an input clock to the clock phase difference absorbing unit 17 when the phase of a pre-switching clock is different from that of a post-switching clock in the selector 14 is as shown in FIG. 4. When the clock signal including a phase difference shown in FIG. 4 is directly input to the phase controlled oscillator 18, an increment/decrement circuit is operated under the above-mentioned control, and one clock is inserted in the PLL reference clock.

In order to effectively prevent such a phenomenon, according to this embodiment, control is made such that the clock input to the phase controlled oscillator 18 does not suffer from a change in phase upon switching by the following operation of the clock phase difference absorbing unit 17.

Figure 7:
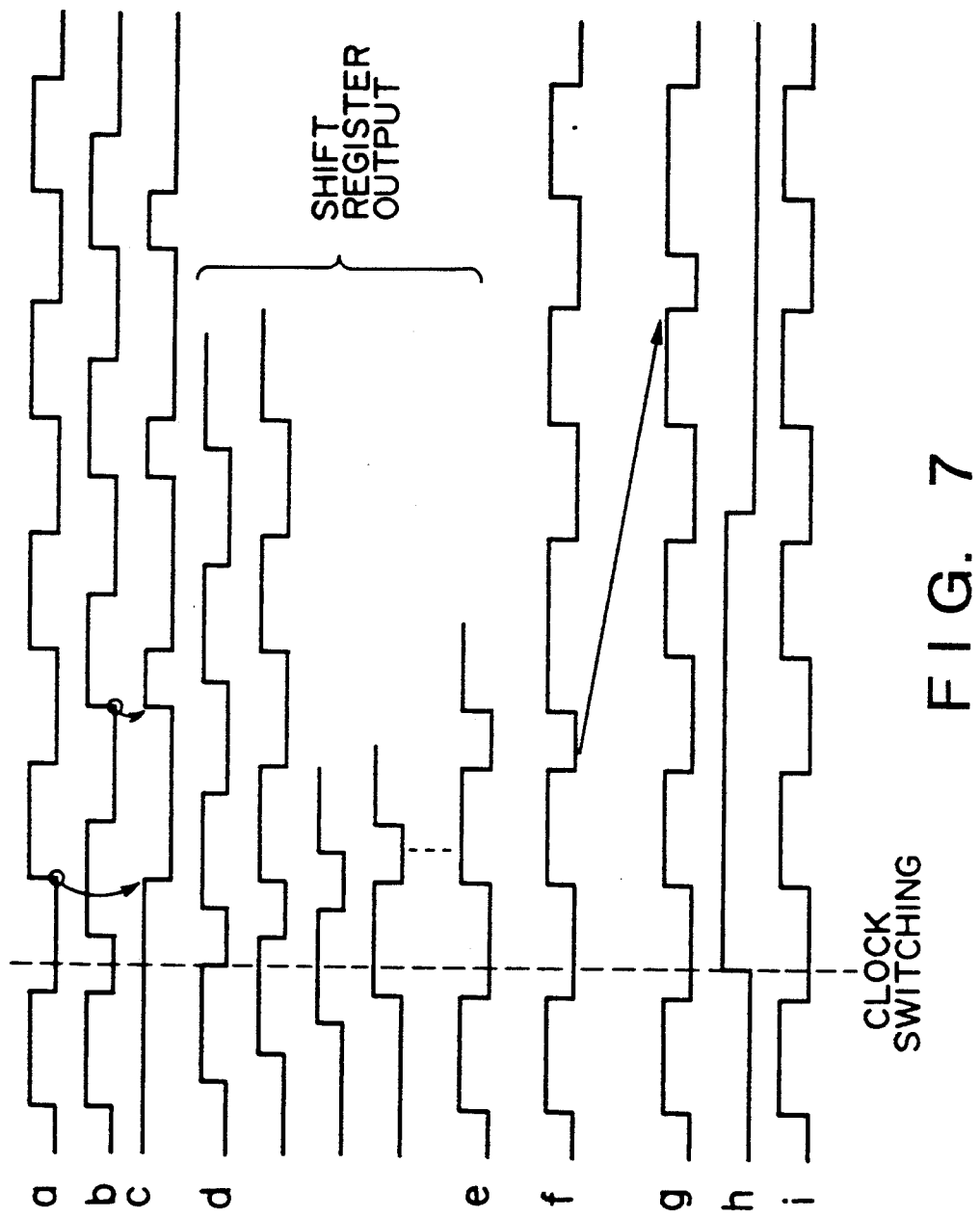
FIG. 7 is an operation timing chart of the phase difference absorbing unit of the second embodiment.

FIG. 7 is a timing chart schematically showing the above-mentioned operations. Reference symbols a to i in FIG. 7 correspond to those of signals a to i in FIG. 6, respectively.

The operation of the clock phase difference absorbing unit of the second embodiment will be described below with reference to FIG. 7.

More specifically, in order to cause the phase of a clock b extracted from a switched line to coincide with that of a pre-switching clock a, the two clocks a and b are latched by the flip-flop 85 in response to a clock 83 having a frequency higher than the extracted clocks (e.g., a 64-kHz clock). The phase comparator 86 compares a phase difference between the latched pre- and post-switching clocks a and b, and outputs a comparison result c indicating a time corresponding to the phase difference to the counter 87. The counter 87 is set in a load state for a time corresponding to the phase difference, and starts a counting operation.

If the extracted clock is delayed by a count time (an output value from the counter 87 × a time for one period of a counter clock) corresponding to a count value of the counter 87 in the load state, a phase difference between the extracted clock and a clock input to the phase controlled oscillator 18 can be eliminated. For this reason, the count value of the counter 87 is latched by the flip-flop 89, and is output to the selector 91.

In order to obtain a clock delayed by a desired delay amount, the shift registers 90 and 91 are used in this embodiment. More specifically, the synchronized extracted clock is shifted by the above-mentioned 64-kHz clock, thereby generating extracted clocks d, . . . , e having eight different delay amounts. The eight clocks are input to the selector 91. The selector 91 selects one of the eight clocks in accordance with a signal from the flip-flop 89 corresponding to an output value from the counter 87 in the load state, and outputs the selected clock signal f to the shift register 92.

As a result, while the lines from which clocks are extracted are not switched, the count value of the counter 87 to be input to the selector 91 is equal to one set in the flip-flop 89 at the immediately preceding switching timing, and the extracted clock f is controlled to always have a predetermined delay amount.

The extracted clock is then output to the phase controlled oscillator 18 as an output signal i via the selector 93.

However, if the clock f delayed by the predetermined delay amount is directly output to the phase controlled oscillator 18 even when the clocks are switched, a clock switching state shown in FIG. 4 occurs. For this reason, when the clocks are switched, the clock f selected by the selector 91 is input to the shift register 92, and a clock obtained by delaying the clock f to be in phase with the pre-switching clock is selected by the selector 93. Thus, the clock selected by the selector 93 is used as the output signal i.

In the above description, as a means for delaying a clock selected from a plurality of clocks extracted from the lines, a shift register is used. However, the delay means is not limited to the shift register, but may be any other means. For example, an analog delay element may be used.

In the above description, in order to delay a clock selected from a plurality of clocks extracted from the lines, a signal having a frequency of 64 kHz is used. When a signal having a higher frequency is used, quicker response to a change in frequency can be attained.

Furthermore, the frequency of a clock to be extracted from a line is not limited to 8 kHz. The same effect as described above can be obtained even when other frequencies are adopted.

Moreover, the number of communication lines connected to the telephone exchange apparatus is eight. However, the number of accommodated communication lines of this embodiment is not limited to this, and the same effect as described above can be obtained by the above arrangement regardless of the number of communication lines.

For example, as can be easily understood from the above description, when the telephone exchange apparatus can connect n lines, the number of clock switching control signals 10 output from the central control unit 4 is log2n. Therefore, as the number of accommodated lines n is increased, the effect of this embodiment can be more outstanding.

As described above, according to this embodiment, the following effects can be obtained.

(1) The switching frequency of a clock to be input to the phase controlled oscillator 18 can be decreased, and a clock to be generated can be further stabilized.

(2) Even when all the lines are in non-communication state, since a line to be selected need not be determined beforehand, limitations upon connection of the lines to the exchange apparatus can be removed.

(3) The circuits can be simplified as compared to the prior arts.

The present invention may be applied to either a system constituted by a plurality of devices, or an apparatus constituted by a single device. The present invention can also be applied to a case wherein processing is attained by supplying a program to a system or an apparatus.

As described above, according to the present invention, the circuit arrangement can be simplified.

The switching frequency of a clock to be input to the phase controlled oscillator can be decreased, and a clock to be generated can be further stabilized.

Even when all the lines are in non-communication state, since a line to be selected need not be determined beforehand, limitations upon connection of the lines to the exchange apparatus can be removed.

As many apparently widely different embodiments of the present invention can be made without departing from the spirit and scope thereof, it is to be understood that the invention is not limited to the specific embodiments thereof except as defined in the appended claims.

What is claimed is:

1. A telephone exchange apparatus comprising:
   connection means for connecting a plurality of communication lines;
   exchange means for exchanging communication between the plurality of communication lines and a plurality of telephone sets;
   selection means for selecting one of the plurality of communication lines: and
   providing means for providing clocks from said one of the communication lines selected by said selection means to said exchange means,
   wherein said selection means does not select another one of the plurality of communication lines once said one of the plurality of communication lines has been selected until a communication via said one of the plurality of communication lines ends.

2. The apparatus according to claim 1, wherein said connection means can connect a maximum of n communication lines, and said selection means reads out an algorithm stored in a memory which stores algorithms for performing selection, and performs selection in accordance with at least log 2n control signals.

3. The apparatus according to claim 1, further comprising data input means for inputting data from the plurality of lines connected by said connection means to said exchange means in synchronism with the clocks from said one of the plurality of communication lines selected by said selection means.

4. A telephone exchange apparatus comprising:
   connection means for connecting a plurality of communication lines;
   exchange means for exchanging communication between the plurality of communication lines and a plurality of telephone sets;
   selection means for selecting a first communication line having first clocks from the plurality of communication lines;
   control means for controlling said selection means so as to select a second communication line having second clocks from the plurality of communication lines;
   delay means coupled to said selected first and second communication lines for delaying the second clocks from the second communication line by a phase difference between the first clocks form the first communication line and the second clocks from the second communication line; and
   providing means for providing the first clocks from the first communication line or the second clocks delayed by said delay means to said exchange means.

5. The apparatus according to claim 4, wherein said delay means further comprises detection means for detecting the phase difference between the first clocks and the second clocks.

6. The apparatus according to claim 4, wherein said delay means includes a shift register, and delays the second clocks using said shift register to cause phases of the first clocks and the second clocks to coincide with each other.

7. The apparatus according to claim 4, wherein said providing means provides the first clocks before a predetermined time has elapsed from selection of the second communication line, and provides the second clocks delayed by said delay means after the predetermined time has elapsed.

8. The apparatus according to claim 4, further comprising data input mean for inputting data from the plurality of lines connected by said connection means to said exchange means in synchronism with the first clocks or the delayed second clocks provided by said providing means.

9. The apparatus according to claim 4, wherein said selection means selects the second communication line when the communication via the first communication line ends.

* * * * *

UNITED STATES PATENT AND TRADEMARK OFFICE
CERTIFICATE OF CORRECTION

PATENT NO. : 5,331,667
DATED : July 19, 1994
INVENTOR(S) : MICHIHIRO IZUMI

It is certified that error appears in the above-identified patent and that said Letters Patent is hereby corrected as shown below:

ON THE TITLE PAGE

At [57] ABSTRACT, line 2 "liens" should read --lines--.
At [57] ABSTRACT, line 11, "postswitching" should read --post-switching--.

IN THE DRAWINGS

Sheet 1 of 13, FIG. 1 "EXTENTION" should read --EXTENSION--.
Sheet 2 of 13, FIG. 2 "OSULLATOR" should read --OSCILLATOR--.

COLUMN 1

Line 7, "1. FIELD OF THE INVENTION" should read --1. Field of the Invention--.
Line 10, "2. PRIOR ART" should read --2. Prior Art--.

COLUMN 2

Line 67, "COMS," should read --COM5,--.
Line 68, "output" should read --output.--.

COLUMN 3

Line 1, ""1"ie" should read --"1," i.e.,--.
Line 13, "COMB" should read --COM8--.
Line 14, ""010"" should read --"010,"--.
Line 15, "selected" should read --selected.--.

COLUMN 4

Line 24, "occur." should read --occur.--

UNITED STATES PATENT AND TRADEMARK OFFICE
CERTIFICATE OF CORRECTION

PATENT NO. : 5,331,667
DATED : July 19, 1994
INVENTOR(S) : MICHIHIRO IZUMI

It is certified that error appears in the above-identified patent and that said Letters Patent is hereby corrected as shown below:

<u>COLUMN 7</u>

Line 57, "Communication" should read --communication--.

<u>COLUMN 9</u>

Line 54, "a signal" (2nd occurrence) should read --from a signal--.
    Line 56, "postswitching" should read --post-switching--.

<u>COLUMN 10</u>

Line 9, "include" should read --includes--.

<u>COLUMN 11</u>

Line 39, "preand" should read --pre- and--.

<u>COLUMN 14</u>

Line 14, "form" should read --from--.

Signed and Sealed this

Twenty-first Day of March, 1995

*Attest:*

BRUCE LEHMAN

*Attesting Officer*      *Commissioner of Patents and Trademarks*